United States Patent Office 3,019,131
Patented Jan. 30, 1962

3,019,131
PLASTIC COATING PROCESSES
Howard C. Haas, Arlington, and Norman W. Schuler, Billerica, Mass., assignors to Polaroid Corporation, Cambridge, Mass., a corporation of Delaware
No Drawing. Filed Nov. 27, 1959, Ser. No. 855,502
22 Claims. (Cl. 117—119.6)

The present invention relates to plastic coating processes and more particularly to processes for applying cross-linked mar-resistant, surface coatings to plastic sheets and laminates and especially to plastic optical elements.

Objects of the present invention are to provide improved methods for catalyzing the in situ polymerization of such surface coatings on plastic sheets and laminates and especially to provide improved methods for catalyzing the polymerization of such coatings on plastic optical elements.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description:

Thermo-setting, cross-linked polymers are finding wide use as mar-resistant finishes for plastic sheets and laminates. Because of the inherent insolubility and non-thermoplasticity of such coatings, it is usually necessary to carry out the polymerization of such polymers in situ. The present invention is concerned with the catalyzation of such polymerizations and especially with the catalyzation of such polymerizations on plastic optical elements such as disclosed in the copending application of Blout, Buzzell and Farney, Serial No. 539,219, filed October 7, 1955.

The above-mentioned copending application is concerned with the application of mar-resistant cross-linked polymeric surface coatings of diethylenic-substituted polyalkyleneglycols to plastic optical elements and especially to plastic light-polarizing elements. In general such light-polarizing elements comprise a lamination or sandwich of a central layer of light-polarizing material such, for example, as molecularly oriented, dichroically stained, polyvinyl alcohol bonded on each of its surfaces to an outer protective sheet of a thermoplastic polymeric material such as a cellulosic plastic, e.g., cellulose acetate butyrate, cellulose acetate, cellulose triacetate. In general the mar-resistant surface coatings are applied by coating a film of the monomeric material on the surface of the plastic sheet or laminate and effecting polymerization by holding the sheet in contact with an optically smooth, heated element. In a preferred embodiment of such processes, the polymerization is carried out continuously by applying a thin film of the monomeric material to the sheet of plastic material and holding the sheet, while it is advancing, in contact with the optically smooth periphery of a heated, rotating drum for a sufficient period to effect polymerization. Generally, free-radical polymerization catalysts and particularly diisopropylpercarbonate are used to effect polymerization.

The present invention is particularly concerned with catalyzing the continuous process, i.e., a process in which the coating is continuously and progressively applied to the surface of a sheet and is then polymerized in situ thereon while the sheet is moving continuously through the coating and polymerizing stages. Preferably, polymerization should be accomplished relatively quickly, and in a preferred embodiment of such processes is accomplished within less than 3 minutes. In addition, the polymerization in such continuous processes is preferably carried out at a relatively low temperature in order that the inner thermoplastic layers will not exceed their softening points and undergo stretching. Further, it is desirable that the catalysts have a high rate of decomposition so as to effect the rapid polymerization and also to insure that a minimum of residual catalyst will be present in the mar-resistant coatings after polymerization. Such residual catalyst may have deleterious effects on the mar-resistant coatings themselves or on adjacent layers upon migrating into such layers, e.g., discoloration of dyes disposed therein. It is further desirable that the catalysts have a low rate of migration so as to prevent migration into such adjacent layers if not all the catalyst is decomposed during polymerization.

It has been found that by using α-naphthoyl peroxide as the catalyst, the polymerization of diethylenically-substituted polyalkylene-glycols on plastic optical elements may be brought about in a short period of time, with rapid decomposition of the catalyst and at temperatures at which the underlying thermoplastic layers will not exceed their softening points. Further, α-naphthoyl peroxide has a structure which does not lend itself to ready migration to adjacent layers. Such low migration contributes kinetically to the rapid polymerization and also reduces the deleterious effect of the catalyst on adjacent layers if it does not completely decompose during polymerization.

In carrying out the continuous process, a sheet of plastic optical material, for example the light-polarizing lamination heretofore described, which comprises a central polarizing layer or film adhesively bonded to two outer protective plastic layers of a cellulose compound such as cellulose acetate butyrate, is coated on one surface with a layer of monomeric material containing the α-naphthoyl peroxide. The coating may be applied as a viscous mass, in any suitable manner, and passed under a doctor blade, or it may be sprayed or flowed onto the sheet. The coated sheet is then brought into contact with an optically smooth surface such, for example, as the peripheral surface of a heated, rotating drum. The sheet is held against the drum under sufficient pressure to cause the surface of the applied coating to assume the smooth optical properties of the drum surface. While the sheet is held against the drum, it is heated and polymerization of the coating is effected. The drum continuously rotates, and the sheet continuously advances with the coated surface in contact with the drum for the period during which polymerization is effected, for example for a period of from one and one-half to three minutes. The opposite surface of the sheet is then similarly coated and, after both surfaces have been so treated, optical elements are stamped or cut from the sheet.

Polymerization may be effected, in a non-continuous manner for example, by holding the sheet of plastic optical material, coated with the monomeric film, between two optically smooth heated platens. As in the continuous processes it is desirable to effect polymerization at a low temperature so that the underlying thermoplastic layers will not exceed their softening point. Similarly, it is desirable that the catalyst rapidly decompose and have a low rate of migration so as to reduce the undesirable effects of residual catalyst.

The preferred materials, which are used in the formation of the mar-resistant coatings on the plastic optical element, are diethylenic derivatives of polyalkyleneglycols. Monomers which are derivatives of polyalkyleneglycols comprising 2 to 5 alkylene groups and especially those wherein the alkylene groups comprise 2 to 3 and especially 2 carbon atoms have been found to be particularly useful. Preferred monomers are the diesters formed from the polyalkyleneglycols and polymerizable α,β-unsaturated carboxylic acids, e.g., methacrylic and acrylic acid. As examples of such monomers, mention may be made of: diethyleneglycol dimethacrylate, diethyleneglycol diacrylate, triethyleneglycol dimethacrylate, triethyleneglycol diacrylate, tetraethyleneglycol dimethacrylate, tetraethyleneglycol diacrylate, pentaethyleneglycol dimethacrylate, and pentaethyleneglycol diacrylate.

The polymerization of the diethylically-substituted polyalkyleneglycols employed in the practice of the present invention is usually strongly inhibited by atmospheric oxygen and should, therefore, be carried out in an air-free atmosphere, for example in carbon dioxide, or against a surfacing element, such for example as the optically smooth periphery of the drum.

In a preferred embodiment of this invention, about 1% of the α-naphthoyl peroxide, based on the weight of the monomer, is employed. However, it should be understood that this amount may be varied to suit particular needs. By using about 1% α-naphthoyl peroxide, polymerization may be usually effected in about three minutes while holding the heated, optically smooth elements at 200 to 205° F. At such temperatures the inner thermoplastic sheets will generally not exceed their softening point. Further, no deleterious effects from the residual catalyst on the mar-resistant coatings or in the adjacent layers of the plastic optical elements are observed. Previously, using the free radical catalysts, heretofore taught, it was usually necessary to run the polymerization at undesirable high temperatures, for example, 220–225° F., to eliminate the deleterious effects of such catalysts.

The following nonlimiting example is illustrative of the processes within the scope of this invention:

*Example I*

A laminate, comprising a center layer of a molecularly oriented polyvinyl alcohol sandwiched between two sheets of dyed cellulose acetate butyrate was coated with a solution comprising:

| | Gm. |
|---|---|
| Tetraethyleneglycol dimethacrylate (containing .006% hydroquinone) | 90 |
| Cellulose nitrate (thickener) | 10 |
| α-Naphthoyl peroxide | 1 | and heated in an air-free atmosphere in contact with an optically smooth platen at 200 to 205° F. for about three minutes to bring about polymerization. No deleterious effects of residual catalyst on the optical element were observed.

Abrasions tests, such as those disclosed in the A.S.T.M. Handbook on Standards on Plastics, 1953 edition, on the optical element produced above, show that the mar-resistant coatings catalyzed by the process of this invention have abrasion resistance which is comparable to that produced through the use of previously taught catalysts at such higher and undesirable temperatures as 220–225° F.

The preferred monomers for use in the processes are generally of relatively low viscosity and, in order that they may be more readily handled and applied to the surface of the optical elements to be coated, the viscosity of the coating composition may be increased by mixing with the monomer a small percentage of a viscosity-increasing polymeric material. A preferred viscosity-increasing material is cellulose nitrate. The addition of the cellulose nitrate to the coating composition is believed also to improve the adhesion or bond between the coating and the plastic sheet to which it is applied, and this is especially so when the plastic sheet comprises cellulose acetate butyrate. In certain instances, for example where the sheet to which the coating is applied comprises cellulose triacetate or where polymerization of the coating is effected in an oven, it has been found desirable to employ a thin coating of nitrocellulose, which is applied to the plastic sheet prior to the application of the coating mixture thereto. It is to be understood, however, that the use of the sub-coat may not be essential to the practice of the present invention.

Preferably, the coating applied to the plastic sheet is of such thickness as to give adequate abrasion or mar resistance, and, where optical elements are subsequently to be cut or stamped from the sheet, the coating should be no thicker than is necessary to give such resistance, for a thick mar-resistant coating has been found to increase greatly the difficulty of cutting or stamping out lenses from the coated sheet as they tend to craze or crack adjacent the cut edges. A preferred coating thickness lies within 0.0003 to 0.001 inch. Coatings of this thickness are adequately mar-resistant. A sheet so coated on both surfaces may have such optical elements as lenses stamped therefrom, and these lenses may be subsequently shaped in a suitable press to the desired curvature, whereas thicker coatings give no effective additional mar resistance and increase substantially the difficulty of cutting out and shaping lenses from the coated sheet.

It will be understood that the methods of catalyzing the polymerization of the mar-resistant coatings described herein may be applied to optical elements and devices other than light-polarizing lenses and filters. They may, for example, be applied to colored, cellulosic filters and lenses such as are employed in nonpolarizing sunglasses and visors and to molded, thermoplastic articles where scratch- or mar-resistant properties are desired.

Since certain changes may be made in the above process without departing from the scope of the invention herein involved, it is intended that all matter contained in the above description shall be interpreted as illustrative and not in a limiting sense.

What is claimed is:

1. In a process for producing plastic optical elements having mar-resistant surface coatings, wherein a thin coating solution comprising a polymerizable monomer of a diethylenic derivative of a polyalkyleneglycol is applied to the surface of said plastic optical element and said coating is polymerized in situ while said coating is held in contact with a heated element having an optically smooth surface; the improvement comprising using α-naphthoyl peroxide as a catalyst in said coating solution.

2. A process as defined in claim 1 wherein said heated element is at a temperature of 200 to 205° F.

3. A process as defined in claim 1 wherein said monomer is a derivative of a polyalkyleneglycol containing 2 to 5 inclusive alkylene groups.

4. A process as defined in claim 3 wherein said alkylene groups comprise 2 to 3 carbon atoms.

5. A process as defined in claim 3 wherein said alkylene groups are ethylene groups.

6. A process as defined in claim 1 wherein said coating solution comprises about 1% of said α-naphthoyl peroxide.

7. A process as defined in claim 1 wherein said monomer is tetraethyleneglycol dimethacrylate.

8. A process as defined in claim 1 wherein said coating solution comprises about 10% of cellulose nitrate.

9. A process as defined in claim 1 wherein said plastic optical element comprises a light-polarizing layer sandwiched between two thermoplastic layers.

10. A process as defined in claim 9 wherein said thermoplastic layers are cellulosic derivatives.

11. A process as defined in claim 1 wherein said diethylenic derivative of a polyalkyleneglycol is a diester of a polyalkyleneglycol and an α,β-unsaturated polymerizable carboxylic acid.

12. In a continuous process for applying a mar-resistant coating of a polymerized diethylenic derivative of a polyalkyleneglycol to a sheet of plastic optical material, wherein a coating solution comprising a polymerizable monomer of a diethylenic derivative of a polyalkyleneglycol is applied to the surface of said plastic optical material, and said sheet of plastic optical material, while said sheet is advancing, is held in contact with the peripheral, optically smooth surface of a rotating heated drum to effect the polymerization of said coating solution; the improvement comprising using α-naphthoyl peroxide as a catalyst in said coating solution.

13. A process as defined in claim 12 wherein said heated drum is at a temperature of 200 to 205° F.

14. A process as defined in claim 12 wherein said monomer is a derivative of a polyalkyleneglycol containing 2 to 5 inclusive alkylene groups.

15. A process as defined in claim 14 wherein said alkylene groups comprise 2 to 3 carbon atoms.

16. A process as defined in claim 14 wherein said alkylene groups are ethylene groups.

17. A process as defined in claim 12 wherein said coating solution comprises about 1% of said α-naphthoyl peroxide.

18. A process as defined in claim 12 wherein said monomer is tetraethyleneglycol dimethacrylate.

19. A process as defined in claim 12 wherein said coating solution comprises about 10% of cellulose nitrate.

20. A process as defined in claim 12 wherein said plastic optical material comprises a light-polarizing layer sandwiched between two thermoplastic layers.

21. A process as defined in claim 20 wherein said thermoplastic layers are cellulosic derivatives.

22. A process as defined in claim 12 wherein said diethylenic derivative of a polyalkyleneglycol is a diester of a polyalkyleneglycol and an α,β-unsaturated polymerizable carboxylic acid.

References Cited in the file of this patent

UNITED STATES PATENTS

| | | |
|---|---|---|
| 2,460,998 | Nelson | Feb. 8, 1949 |
| 2,565,259 | Nyquist | Aug. 21, 1951 |
| 2,898,231 | Haas | Aug. 4, 1959 |
| 2,917,410 | Vitalis | Dec. 15, 1959 |